(12) United States Patent
Delzenne

(10) Patent No.: US 7,015,416 B2
(45) Date of Patent: Mar. 21, 2006

(54) PLASMA CUTTING TORCH SPEED MODULATION

(75) Inventor: Michel Delzenne, Franconville (FR)

(73) Assignee: La Soudure Autogène Française, Paris (FR)

( * ) Notice: Subject to any disclaimer, the term of this patent is extended or adjusted under 35 U.S.C. 154(b) by 0 days.

(21) Appl. No.: 10/492,229

(22) PCT Filed: Sep. 24, 2002

(86) PCT No.: PCT/FR02/03254

§ 371 (c)(1),
(2), (4) Date: Nov. 15, 2004

(87) PCT Pub. No.: WO03/041903

PCT Pub. Date: May 22, 2003

(65) Prior Publication Data
US 2005/0077271 A1    Apr. 14, 2005

(30) Foreign Application Priority Data
Oct. 9, 2001    (FR)  .................................. 01 12967

(51) Int. Cl.
*B23K 9/00*    (2006.01)

(52) U.S. Cl. .............................. 219/121.44; 219/121.4

(58) Field of Classification Search ........... 219/121.11, 219/121.36, 121.39, 121.4, 121.41, 121.42, 219/121.44, 121.54, 121.56, 121.59
See application file for complete search history.

(56) References Cited

U.S. PATENT DOCUMENTS

| 4,017,707 A | * | 4/1977 | Brown et al. | 219/121.36 |
| 5,695,662 A | * | 12/1997 | Couch et al. | 219/121.39 |
| 6,222,154 B1 | | 4/2001 | Yamaguchi, et al. | |

FOREIGN PATENT DOCUMENTS

| EP | 0 562 111 B1 | 4/1991 |
| EP | 1 048 387 A2 | 3/2000 |
| EP | 1 048 387 A3 | 3/2000 |
| GB | 2 281 640 A | 3/1995 |
| WO | WO 99/04924 | 7/1998 |

OTHER PUBLICATIONS

International Search Report for PCT/FR02/03254.

* cited by examiner

Primary Examiner—Tu Hoang
(74) Attorney, Agent, or Firm—Elwood Haynes (57) ABSTRACT

A method and a system for the plasma arc cutting of a workpiece with automatic adaptation of the characteristics of the plasma jet by making various corrections, simultaneously and in real time, to several parameters, including the cut path.

31 Claims, 2 Drawing Sheets

Prior Art

Prior Art

PLASMA CUTTING TORCH SPEED MODULATION

BACKGROUND OF THE INVENTION

1. Field of the Invention

The present invention relates to a method and to a system for the plasma arc cutting of a workpiece with automatic adaptation of the characteristics of the plasma jet by making corrections, simultaneously and in practically real time, to several parameters, in particular in the complicated portions of the cut path.

2. Related Art

When cutting out of relatively complicated shapes in workpieces, possibly involving sharp changes of direction within the cut paths, for example when making an acute angle in order to form, for example, a pointed profile, it is customary to use a plasma cutting system comprising a plasma cutting torch, a generator for supplying electric current to the torch and to the workpiece, a motorized multiaxis machine for moving the torch relative to the workpiece, or vice versa, along two-dimensional or three-dimensional cut paths, means for programming and controlling the movements of the shafts of the machine, such as a computer numerical control (CNC) console, and means for supplying plasma gas and optionally shielding gas to the plasma torch.

It has actually been found in practice that any sharp change of direction during execution of the cut path requires a change in speed of movement of the torch along the path on the part of the CNC machine so as to ensure that the path executed corresponds exactly to the programmed path.

Thus, with respect to the point or site of a sharp change of direction, there is a first, "deceleration", region located upstream of said point of sharp change of direction, that has to be taken into account in order to reduce the speed of the movement shaft or shafts in question so as to reach the point of change of direction without overshooting the programmed path profile.

This first region is followed by a second, "acceleration", region located downstream of the point of sharp change of direction, which also has to be taken into account in order to increase the speed of the movement shaft or shafts in question so that, starting from the resulting speed at the end of deceleration at the point of sharp change of direction, the speed of movement of the torch along the initially programmed path at the end of acceleration is again reestablished.

Moreover, when the machine modifies the initially programmed cutting speed in order to negotiate a change of direction of the cut path, the plasma jet coming from the torch, the characteristics of which were initially adapted and optimized for the initially programmed cutting speed, therefore no longer has its characteristics perfectly adapted to these temporary, new cutting speed conditions, especially from the standpoint of the thermal energy used to locally melt the material and from the standpoint of the kinetic energy used to expel the molten material out of the cut kerf.

This therefore results in the cutting quality deteriorating in the regions where the cutting speed is different from that initially programmed.

By way of example, the deterioration in the cutting quality may be characterized by the formation of burrs that adhere relatively strongly to the base of the cutting kerf and/or by a broadening of the cutting kerf and/or by a loss of perpendicularity of the cut faces and/or by a change in the angle formed by the cut face and the plane formed by the workpiece. This is illustrated in particular in FIG. 2 appended hereto.

To try to solve these problems, document EP-A-1 048 387 proposes a method for adapting the thermal energy of the plasma jet according to the degree of linear advance of the torch and/or to a control parameter proportional to this degree of linear advance, for example the cut diameter of a circular path.

However, this method is not entirely satisfactory, especially as it does not provide for the kinetic energy of the plasma jet to be adapted according to said degree of linear advance.

Consequently, in the absence of such complementary adaptation of the kinetic energy, to solely adapt the intensity of the cutting current according to the degree of linear advance would not preclude the generation of all or some of the aforementioned defects and problems during the cutting operation.

Moreover, to help to keep the cut quality constant over the entire cut path, it is also necessary to be able to keep the torch at an approximately constant distance from the plane formed by the workpiece throughout the time taken to execute the cut path.

For this purpose, plasma cutting machines are generally provided with a motorized Z-axis shaft for moving the torch in a direction perpendicular to the plane (XY axis) formed by the workpiece so as to regulate the distance separating the torch from the plane formed by the workpiece.

This distance is kept approximately constant by a device that continuously measures the voltage of the plasma arc and compares it to a preprogrammed value corresponding to the optimum work conditions. Such methods and devices are described especially in documents WO-A-99/04924 and EP-A-562 111.

When a difference is detected between the measured value and the reference value, depending on the requirement, the motorized Z-axis shaft moves the torch away from or closer to the workpiece so that the measured voltage value is again the reference voltage value.

However, automatic adjustment of this optimum distance according to a measurement of the arc voltage loses its effectiveness when the characteristics of the plasma arc are changed, especially as a result of a change in cutting speed and/or a change in the cutting current and/or a change in the flow rate and/or the pressure of the plasma gas and optionally of the shielding gas.

Beside the case of sharp changes of direction, such as the abovementioned angles, which involve a deceleration followed by an acceleration, there are other cases in which problems of cut quality deterioration occur.

Thus, the problem also arises when plasma-cutting small shapes in metal plates, such as small holes and holes of various, for example round, oblong, etc., shapes, or path portions having fine details, such as curves and filets of small dimensions, for which the CNC machine moves the torch at a speed below the programmed speed, for the same reasons as in the case of cutting angles, namely to comply with the programmed geometry.

In that case, it is not possible to set the minimum radius below which the CNC machine will change the speed, as this depends on the numerical control and on the "machine" parameters, for example the maximum tracking error imposed in the machine program.

However, and as an illustration, if a CNC machine is programmed for a given tracking error and a minimum radius of 50 mm for an actual speed of 10 m/min, any path of a radius or path having a radius of 5 mm will be executed, in that portion, at a maximum speed of 1 m/min (10×5/50), which means that, if the procedure calls for an optimum cutting speed of 3 m/min, there will be defects in the cut in this region.

Starting from this situation, the problem that arises is therefore to improve the known methods and devices, that is to say to be able to prevent the formation of the abovementioned defects and to keep the cut quality substantially constant over the entire perimeter of the cut workpieces, whatever it is, that is to say over the entire cut path, most particularly when the cut path is complicated, for example when it has acute or similar angles, or when shapes of small size or path regions having fine details have to be cut, and to do so irrespective of the speed changes generated by the machine in order to negotiate the cut contours thereof.

SUMMARY OF THE INVENTION

The invention therefore relates to a method of plasma cutting along a predefined cut path in a workpiece to be cut, employing a plasma cutting torch supplied with a current having a mean value ($I_m$) and/or an rms value ($I_{rms}$) and with at least one plasma gas, said torch delivering a plasma jet in order to produce a cut kerf in the workpiece by relative movement of the torch relative to the workpiece to be cut along the predefined cut path, said cut path comprising at least one path portion in which the cutting speed can vary, in which method the characteristics of the plasma jet are adapted in said at least one path portion so as to keep the torch at an approximately constant distance from the workpiece to be cut along substantially the entire cut path and during the cutting of the workpiece by:

(a) modulating the thermal energy (TE) injected into the workpiece according to the cutting speed variations and by adjusting the mean value ($I_m$) or the rms value ($I_{rms}$) of the cutting current;

(b) modulating the kinetic energy (KE) of the plasma jet according to the cutting speed variations and/or according to the adjustment of the mean value ($I_m$) or the rms value ($I_{rms}$) of the current; and (c) modulating the plasma arc voltage (U) according to the cutting speed variation, the mean value ($I_m$) or the rms value ($I_{rms}$) of the cutting current and/or the flow rate or the pressure of the plasma gas.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENT

The invention therefore relates to a method of plasma cutting along a predefined cut path in a workpiece to be cut, employing a plasma cutting torch supplied with a current having a mean value ($I_m$) and/or an rms value ($I_{rms}$) and with at least one plasma gas, said torch delivering a plasma jet in order to produce a cut kerf in the workpiece by relative movement of the torch relative to the workpiece to be cut along the predefined cut path, said cut path comprising at least one path portion in which the cutting speed can vary, in which method the characteristics of the plasma jet are adapted in said at least one path portion so as to keep the torch at an approximately constant distance from the workpiece to be cut along substantially the entire cut path and during the cutting of the workpiece by:

a) modulating the thermal energy (TE) injected into the workpiece according to the cutting speed variations and by adjusting the mean value ($I_m$) or the rms value ($I_{rms}$) of the cutting current;

b) modulating the kinetic energy (KE) of the plasma jet according to the cutting speed variations and/or according to the adjustment of the mean value ($I_m$) or the rms value ($I_{rms}$) of the current; and c) modulating the plasma arc voltage (U) according to the cutting speed variation, the mean value ($I_m$) or the rms value ($I_{rms}$) of the cutting current and/or the flow rate or the pressure of the plasma gas.

Depending on the case, the method of the invention may include one or more of the following technical features:

the thermal energy (TE), kinetic energy (KE) and plasma arc voltage (U) modulations of steps (a), (b) and (c) are respectively performed approximately simultaneously (i.e. correlated) and/or practically in real time;

when the instantaneous cutting speed ($V_i$) becomes less than the initially programmed cutting speed ($V_p$), the thermal energy is adjusted in step (a) by reducing the mean value ($I_m$) or the rms value ($I_{rms}$) of the cutting current;

when the instantaneous cutting speed ($V_i$) becomes less than the initially programmed cutting speed ($V_p$), the kinetic energy (KE) is adjusted in step (b) by reducing the flow rate and/or the pressure of the plasma gas, and possibly of the shielding fluid, in combination (in correlation) with the variation in the mean value ($I_m$) or rms value ($I_{rms}$) of the cutting current;

the modulation in the reference plasma arc voltage (U) of step (c) is performed according to the variation of the flow rate and/or the pressure of the shielding fluid;

the path portion in which the cutting speed can vary corresponds to a part of said cut path where the torch must undergo a sharp change of direction;

the path portion corresponds to a part of said cut path making an acute angle in order to form a pointed profile, that is to say an angle between 1° and 160°, preferably between 5° and 120° and more preferably between 10° and 100° (the angle is that made by the cut path or the kerf at the site of the change of direction);

the thermal energy (TE), kinetic energy (KE) and plasma arc voltage (U) reductions of steps (a), (b) and (c) are respectively performed approximately in a deceleration region located upstream of the site of the sharp change of direction, from which region the speed of movement of the torch is reduced so as to reach the point of sharp change of direction without overshooting the programmed path profile;

the thermal energy (TE), kinetic energy (KE) and plasma arc voltage (U) increases of steps (a), (b) and (c) are respectively performed approximately in an acceleration region, located downstream of the site of sharp change of direction, from which region the speed of movement of the torch is increased so that, starting from the speed resulting from the end of deceleration at the point of sharp change of direction, the speed of movement of the torch along the initially programmed path at the end of acceleration is again reestablished.

Of course, the lengths of the acceleration region and the deceleration region may vary depending, for example, on the cutting speed, the type of angle to be cut, the thickness of the material or its grade, and the type or composition of cutting gas used, it being possible for said lengths to range from a few millimeters to a few centimeters.

The invention also relates to an automatic installation for plasma cutting at least one workpiece to be cut, employing:
- at least one plasma cutting torch for cutting the workpiece along a predefined cut path in the workpiece to be cut;
- electric current supply means for supplying at least the torch with an electric current having a mean value ($I_m$) and/or rms value ($I_{rms}$);
- gas supply means for supplying the torch with at least one plasma gas and optionally at least one shielding gas;
- gas control means for adjusting the flow rate or the pressure of the gas supplied to the torch;
- torch support means for supporting said plasma torch;
- workpiece support means for holding and/or supporting the workpiece while it is being cut;
- torch movement means for producing a relative movement of the torch with respect to the workpiece to be cut;
- cut path control means for programming at least one desired cut path and/or for storing it in memory;
- torch control means that cooperate with at least said torch movement means and said cut path control means in order to cut the workpiece along said predefined cut path;
- cutting speed modulation means for increasing, decreasing or keeping constant the instantaneous speed of movement of the torch;
- means for adapting the plasma jet characteristics in order to keep the torch at an approximately constant distance from the workpiece to be cut along substantially the entire cut path and during the cutting of the workpiece, which comprise:
  (i) thermal energy modulation means for modulating the thermal energy (TE) injected into the workpiece according to the cutting speed variations by the cutting speed modulation means by adjusting the mean value ($I_m$) or the rms value ($I_{rms}$) of the cutting current,
  (ii) kinetic energy modulation means for modulating the kinetic energy (KE) of the plasma jet according to the cutting speed variations by the cutting speed modulation means and/or according to the adjustment of the mean value ($I_m$) or the rms value ($I_{rms}$) of the current by the thermal energy modulation means and
  (iii) voltage modulation means for modulating the plasma arc voltage (U) according to the cutting speed variations by the cutting speed modulation means, to the mean value ($I_m$) or the rms value ($I_{rms}$) of the cutting current by the thermal energy modulation means and/or to the flow rate or the pressure of the plasma gas by the gas control means.

According to another embodiment, the invention also relates to a method of plasma cutting along a predefined cut path in a workpiece to be cut, employing a plasma cutting torch supplied with a current having a mean value ($I_m$) and/or an rms value ($I_{rms}$) and at least one plasma gas, said torch delivering a plasma jet in order to produce a cut kerf in the workpiece by relative movement of the torch relative to the workpiece along the predefined cut path, said cut path comprising at least the following successive portions), taken in the following order:
- a first cut path portion in which the cutting speed is greater than or equal to a first fixed non-zero threshold value,
- a deceleration portion in which the cutting speed decreases down to a minimum value below said first threshold value,
- an acceleration portion in which the cutting speed increases from said given minimum value up to at least a second fixed non-zero threshold value, and
- a second path portion in which the cutting speed is greater than or equal to said second fixed threshold value, in which method the characteristics of the plasma jet are adapted, at least during the movement of the torch in said deceleration portion and in said acceleration portion, so as to keep the torch at an approximately constant distance from the workpiece to be cut along substantially the entire cut path and during the cutting of the workpiece by:
  (a) modulating the thermal energy (TE) injected into the workpiece according to the cutting speed variations and by adjusting the mean value ($I_m$) or the rms value ($I_{rms}$) of the cutting current,
  (b) modulating the kinetic energy (KE) of the plasma jet according to the cutting speed variations and/or according to the adjustment of the mean value ($I_m$) or the rms value ($I_{rms}$) of the current, and
  (c) modulating the plasma arc voltage (U) according to the cutting speed variation, the mean value ($I_m$) or the rms value ($I_{rms}$) of the cutting current and/or the flow rate or the pressure of the plasma gas.

Depending on the case, the method of the invention according to this other embodiment may include one or more of the following technical features:
- the minimum value is between 0 and 0.1×TV, and preferably the minimum value is zero or almost zero;
- the second threshold value TV2 and said first threshold value TV1 are such that: 0.8×TV1<TV2<1.2×TV1, and preferably the second threshold value and said first threshold value are approximately equal;
- the respective lengths of the deceleration portion and of the acceleration portion are between 1 mm and 10 cm, preferably between 3 mm and 30 mm;
- the deceleration portion and of the acceleration portion make between them an angle between 1° and 160°, preferably between 5° and 120°;
- the thermal energy (TE) injected into the workpiece is reduced by reducing the mean value ($I_m$) or rms value ($I_{rms}$) of the current when the cutting speed becomes less than said first threshold value or when the speed difference (ΔV), within a time interval (Δt), between the programmed speed and the actual speed along the path exceeds a predetermined value.

According to yet another aspect, the invention a method of plasma cutting employing a plasma cutting torch supplied with a current having a mean value ($I_m$) and/or an rms value ($I_{rms}$) and with at least one plasma gas, said torch delivering a plasma jet in order to produce a cut kerf in the workpiece by relative movement of the torch relative to the workpiece to be cut along the predefined cut path at a preset cutting speed, both the movement and the speed of movement of said torch being controlled by control means, preferably a numerical control console, the preset cutting speed being stored in memory by said control means, in which:

one or more small or complex-shape features are cut into said workpiece, during at least part of the total cutting time, at a modulated cutting speed less than the programmed preset cutting speed, and at the same time the characteristics of the plasma jet are adapted over the period of cutting said feature or features so as to keep the torch at an approximately constant distance from the workpiece to be cut by:
(a) modulating the thermal energy (TE) injected into the workpiece according to the cutting speed variations and by adjusting the mean value ($I_m$) or the rms value ($I_{rms}$) of the cutting current,
(b) modulating the kinetic energy (KE) of the plasma jet according to the cutting speed variations and/or according to the adjustment of the mean value ($I_m$) or the rms value ($I_{rms}$) of the current, and
(c) modulating the plasma arc voltage (U) according to the cutting speed variation, the mean value ($I_m$) or the rms value ($I_{rms}$) of the cutting current and/or the flow rate or the pressure of the plasma gas.

Preferably, the small or complex-shape feature or features to be cut constitute cavities cut into the plate, the actual cutting speed, whether constant or not, is kept below the programmed preset cutting speed during complete execution of each cavity, and the cutting time (Ic), cutting gas pressure ($P_c$) and reference arc voltage ($U_c$) parameters used to regulate the nozzle/workpiece height are adapted to the actual cutting speed.

The small or complex-shape feature or features to be cut constitute cavities cut into the plate, in particular circular or oblong holes or holes of any other complex shape, with or without an axis of symmetry, forming an aperture in the plate, typically having dimensions of the order of a few mm to at most a few cm.

Figure 1:
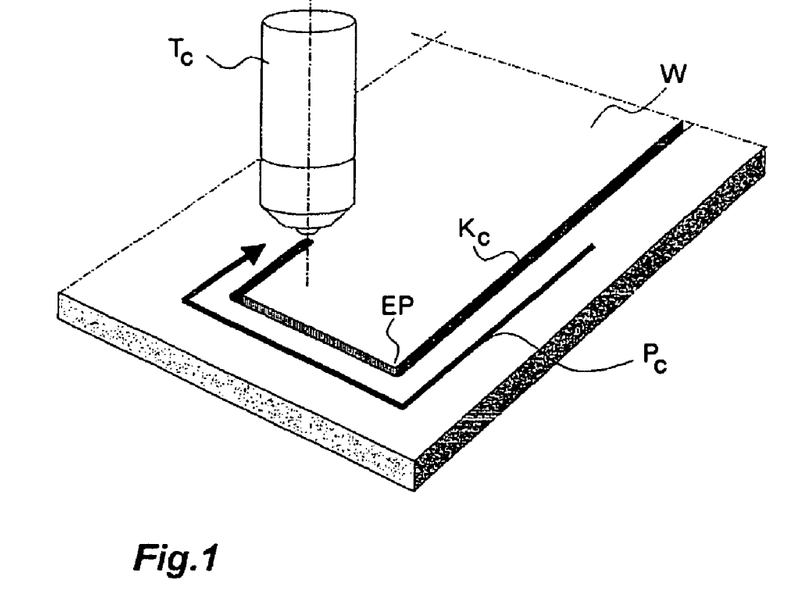
FIG. 1 shows the principle of how a cut path is produced with a plasma cutting torch.

FIG. 1 shows schematically a plasma cutting torch $T_c$ executing a cut path $P_c$ in a workpiece W forming a cut kerf $K_c$ having sharp changes of direction, namely angles that are in this case around 90°.

Figure 2:
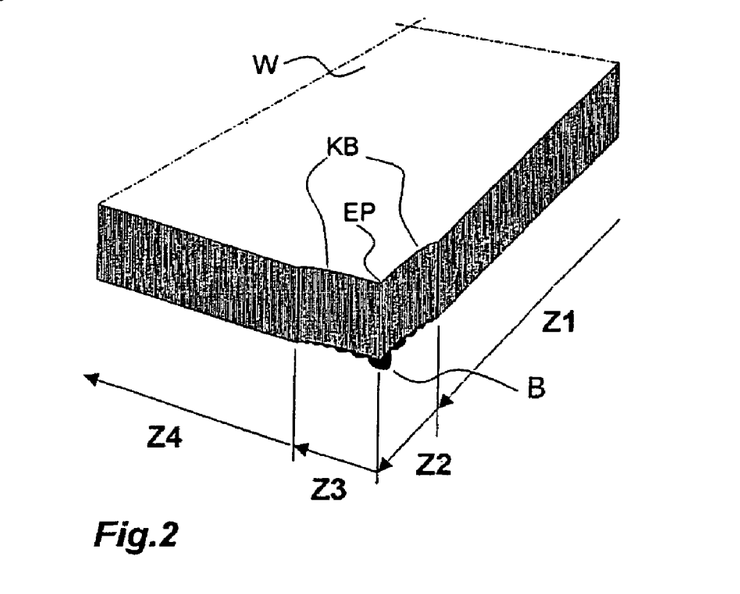
FIG. 2 shows a detailed view of one of the edges of a cut kerf produced with a method according to the prior art.

FIG. 2 shows a close-up view of one of the two edges of a cut kerf produced with a method according to the prior art, revealing the defects that can appear at the point of a sharp change of direction in the cut path, that is to say at one of the angles of the cut kerf $K_c$ of FIG. 1.

The first region Z1 corresponding to an optimum cut portion in which the programmed cutting speed has been respected and which therefore does not have a defect.

This first region Z1 precedes a second region Z2 or deceleration region in which the numerical control machine controlling the path, upon approaching the sharp change of direction, has caused the movement of the shafts carrying the plasma cutting torch to undergo a deceleration, allowing it to move along the desired path, in order to bring the torch to the extreme point EP of said sharp change of direction at a virtually zero speed.

This region Z2 conventionally has at least two types of defect, namely a kerf broadening KB, which impairs the straightness of the cut face, and burrs B, which result in an indispensable subsequent finishing operation carried out on the cut workpiece in order to remove said burrs, for example by brushing or by other known techniques.

After the extreme point EP has been reached and after the sharp change of direction has been made, there follows a third region Z3, called the acceleration region, in which the numerical control machine increases the speed of the shafts carrying the plasma cutting torch from a virtually zero speed at the point EP to the programmed speed value.

This region Z3 generally has at least the same types of defect as the region Z2, namely a kerf broadening KB and burrs B.

At the end of the acceleration region Z3, when the programmed cutting speed is again reached, there follows a fourth region Z4 of optimum cutting, that is to say a region in which the correct operating conditions are reestablished, which explains the absence of burrs and the straightness of the cut surface.

Figure 3:
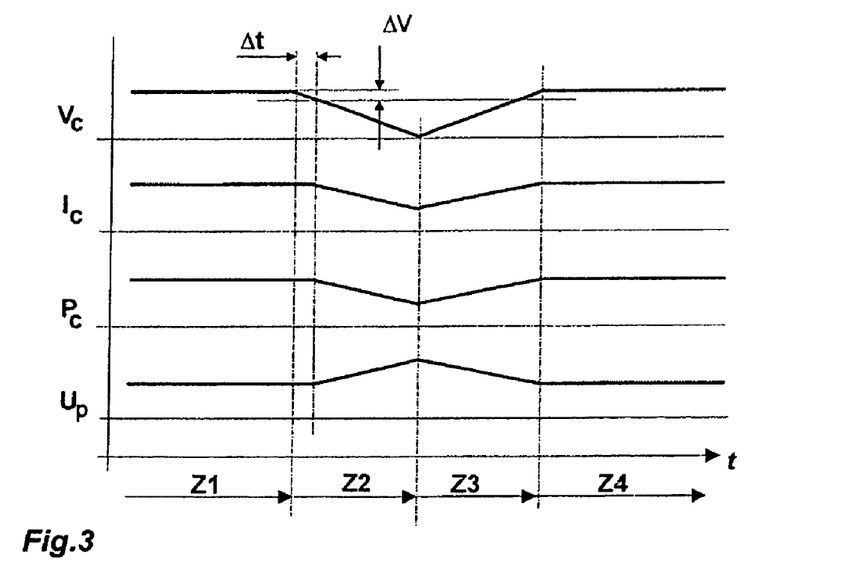
FIG. 3 shows the principle of the proportional-type modulation of the thermal energy injected into the workpiece as correlations of the variations in cutting speed made during implementation of the method of the present invention.

According to the invention and as shown diagrammatically in FIG. 3, the thermal energy injected into the workpiece is modulated according to the variations in cutting speed, for example when the cutting speed $V_c$ (in zone Z2) becomes less than the initially programmed optimum cutting speed, or when the difference $\Delta V$, within a time interval $\Delta t$, between the programmed speed and the actual speed along the path exceeds a predetermined value, the thermal energy imparted to the workpiece is adapted by reducing the mean value $I_c$ or rms value of the cutting current.

In addition, according to the invention, the kinetic energy exerting a thrust on the molten metal, so as to expel it from the cut kerf, is modulated according to the variations in cutting speed and/or according to the adaptation of the mean or rms value of the cutting current, for example when the cutting speed becomes less than the initially programmed optimum cutting speed (first threshold speed), the kinetic energy is adapted by reducing the flow rate and/or the pressure $P_c$ of the plasma gas and optionally of the shielding gas together with the variation in the cutting current.

Moreover, the reference plasma arc voltage $U_p$ together with the variation in cutting speed, in the cutting current and in the flow rate or pressure of the plasma gas, and optionally in the flow rate or pressure of the shielding fluid, is also simultaneously modulated so as to compensate for the changes in the characteristics of the plasma jet and thus to keep the torch at an approximately constant distance from the workpiece, and to do so irrespective of the variations in the abovementioned parameters.

The foregoing describes the parameter changes made when the optimum speed $V_c$ in the region Z1 decreases in the deceleration region Z2 right up to the extreme point EP; of course, these same parameters undergo the opposite change in the acceleration region Z3 until the optimum cutting conditions of region Z4 are resumed.

The simultaneous and almost instantaneous variations in the parameters that determine the characteristics of the plasma jet, especially the cutting current, flow rate or pressure of the plasma gas and optionally of the shielding fluid, together with the plasma arc voltage, correspondingly with the variations in cutting speed relative to an initially programmed speed, are controlled automatically by a controller which, depending on the information about the variation in cutting speed delivered to it by the CNC machine or the tachymetric generators of the shaft actuators of the cutting machine, sends the parameter-correcting commands according to preestablished laws of determination, thus ensuring that the cut quality is virtually constant over the entire perimeter of the cut workpieces, and is so irrespective of the variations in cutting speed that result from a precise geometrical tracking of the cut path by the system that controls the movements of the shafts of the machine.

Figure 4:
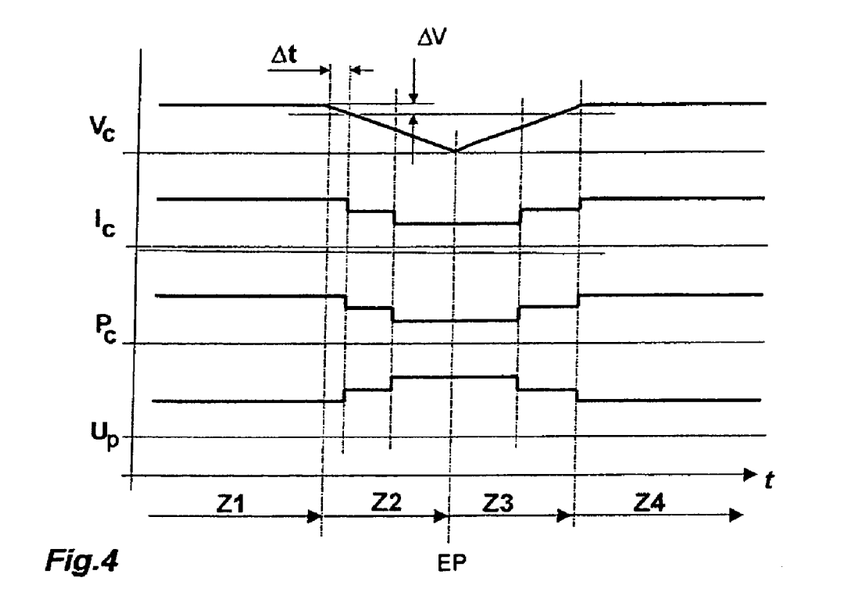
FIG. 4 is similar to FIG. 3, but relates to a modulation of the stepped type.

The corrections of the aforementioned parameters, which are caused by the controller, may be of the proportional (ramp) type, as shown diagrammatically in FIG. 3, that is to say that the values of the aforementioned parameters correspond to any new value of the cutting speed, or of the stepped type, as shown schematically in FIG. 4, that is to say that fixed values of the aforementioned parameters correspond to a new value of the cutting speed, within a range bounded by a minimum and a maximum, provided that the limits of the range in speed variation are not infringed.

When one of the limits of the range is infringed, new values of the aforementioned parameters are set and remain valid provided that the limits of the new range of variation in cutting speed are not infringed.

With regard to regulating the plasma arc voltage in the deceleration and acceleration regions, the position of the motorized Z-axis shaft may also be locked in its final position before the start of deceleration, until the programmed cutting speed has been reestablished after a sharp change of direction in the cut path. Although such a system is simpler to manage, it does prove, however, to be slightly less effective than a proportional-type or stepped voltage regulation.

The invention is also applicable to the cutting of cut paths that approach angled paths, in the sense that they have a maximum set speed region Z1, a deceleration region Z2, an acceleration region Z3 followed by a region Z4 with again a maximum set speed, but with the difference that, between Z2 and Z3, there is no change to an almost zero speed, as in the case of an angle, but another region of reduced (but not necessarily constant) speed corresponding to the execution of the fine details, that is to say, in this case, there are three adaptation regions Z2, Z2' and Z3 for which it would be necessary to adapt to $I_c$, $P_c$ and $U_c$.

The invention is therefore based on an automatic adaptation of the characteristics of the plasma jet by correcting, simultaneously and in practically real time, several parameters so as to compensate for the changes in characteristic of the plasma jet and to keep the torch at an approximately constant distance from the workpiece to be cut over the entire cut path, including in portions of this cut path that are complicated, especially in the regions of sharp changes of direction, such as angles.

Of course, the composition of the plasma gas used may be adapted to the method employed, especially according to the thickness of the material to be cut, to its nature and composition, to the desired cut quality criterion, etc.—the choice on a case-by-case basis of this gas composition is within the competence of a person skilled in the art. The same applies to the parameters and numerical values to be chosen for the method in question, and also the manner in which they are programmed in the machines for controlling and driving the installation, especially the CNC machine.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of plasma cutting, comprising:
   a) defining a cut path in the workpiece to be cut;
   b) employing a plasma cutting torch, said torch comprising at least one plasma gas and a current, said current comprising a mean value and an rms value;
   c) delivering a plasma jet with said torch in order to produce a cut kerf in said workpiece by movement of the torch relative to said workpiece along said cut path, wherein said plasma gas has a flowrate and a pressure, said torch movement comprising an initially programmed cutting speed and an instantaneous cutting speed, said cut path comprising at least one path portion in which the instantaneous cutting speed can vary, thereby resulting in an instantaneous cutting speed variation, said plasma jet comprising thermal energy, kinetic energy, and plasma arc voltage; and
   d) keeping said torch at an approximately constant distance from said workpiece along substantially the entire cut path and during the cutting of the workpiece by adapting the characteristics of said plasma jet in said at least one path portion, said adaptation comprising:
      (i) modulating said thermal energy injected into said workpiece according to the instantaneous cutting speed variations and by adjusting said mean value or said rms value of said current;
      (ii) modulating said kinetic energy of said plasma jet according to the instantaneous cutting speed variations or according to the adjustment of said mean value or said rms value of said current; and
      (iii) modulating said plasma arc voltage according to at least one parameter selected from the group consisting of the instantaneous cutting speed variation, the mean value of the current, the rms value of the current, the plasma gas flowrate, and the plasma gas pressure.

2. The method as claimed in claim 1, wherein said thermal energy, said kinetic energy, and said plasma arc voltage modulations of steps (i), (ii), and (iii) are respectively performed approximately simultaneously.

3. The method as claimed in claim 2, wherein said thermal energy, said kinetic energy, and said plasma arc voltage modulations of steps (i), (ii), and (iii) are respectively performed in real time.

4. The method as claimed in claim 1, wherein when said instantaneous cutting speed becomes less than said initially programmed cutting speed, said thermal energy is adjusted in step (i) by reducing said mean value or said rms value of said current.

5. The method as claimed in claim 1, wherein when said instantaneous cutting speed becomes less than said initially programmed cutting speed, said kinetic energy is adjusted in step (ii) by modulating the flow rate or the pressure of said plasma gas in combination with the variation in said mean value or said rms value of said current.

6. The method as claimed in claim 1, wherein said plasma cutting torch further comprises a shielding fluid, wherein when said instantaneous cutting speed becomes less than said initially programmed cutting speed, said kinetic energy is adjusted in step (ii) by modulating the flow rate or the pressure of said plasma gas and said shielding fluid, in combination with the variation in said mean value or said rms value of said current.

7. The method as claimed in claim 1, wherein said plasma cutting torch further comprises a shielding fluid, wherein said modulation in the plasma arc voltage of step (iii) is performed according to the variation of the flow rate or the pressure of said shielding fluid.

8. The method as claimed in claim 1, wherein said path portion in which said instantaneous cutting speed can vary corresponds to a part of said cut path where said torch must undergo a sharp change of direction.

9. The method as claimed in claim 8, wherein said path portion corresponds to a part of said cut path making an acute angle in order to form a pointed profile.

10. The method as claimed in claim 8, wherein said cut path comprises a programmed path profile, wherein said thermal energy, said kinetic energy, and said plasma arc voltage reductions of steps (i), (ii), and (iii) are respectively performed approximately in a deceleration region located upstream of the site of said sharp change of direction, from which region the instantaneous cutting speed of said torch is reduced so as to reach the point of said sharp change of direction without overshooting said programmed path profile.

11. The method as claimed in claim 8, wherein said cut path comprises an initially programmed path profile, wherein said thermal energy, said kinetic energy and said plasma arc voltage increases of steps (i), (ii), and (iii) are respectively performed approximately in an acceleration region, located downstream of the site of said sharp change of direction, from which region the instantaneous cutting speed of the torch is increased so that, starting from the speed resulting from the end of deceleration at the point of said sharp change of direction, the instantaneous cutting speed of said torch along said initially programmed path at the end of acceleration is again reestablished.

12. An automatic installation apparatus for plasma cutting at least one workpiece, employing:
   a) at least one plasma cutting torch for cutting the workpiece along a predefined cut path in the workpiece, said plasma cutting torch comprising a plasma jet, said plasma jet comprising characteristics, said characteristics comprising thermal energy, kinetic energy, and plasma arc voltage;
   b) an electric current supply means for supplying at least said torch with an electric current having a mean value and an rms value;
   c) a gas supply means for supplying said torch with at least one plasma gas and at least one shielding gas;
   d) a gas control means for adjusting the flow rate or the pressure of said gas supplied to the torch;
   e) a torch support means for supporting said plasma torch;
   f) a workpiece support means for holding and supporting said workpiece while it is being cut;
   g) a torch movement means for producing a relative movement of said torch with respect to said workpiece, said torch thereby having an instantaneous speed with respect to said workpiece;
   h) a cut path control means for programming at least one desired cut path and for storing it in memory;
   i) a torch control means that cooperates with at least said torch movement means and said cut path control means in order to cut said workpiece along said predefined cut path;
   j) a cutting speed modulation means for increasing, decreasing or keeping constant the instantaneous speed of the torch, said torch thereby having an instantaneous cutting speed variation;
   k) a means for adapting the plasma jet characteristics in order to keep said torch at an approximately constant distance from said workpiece along substantially the entire cut path and during the cutting of the workpiece, which comprise:
      (i) thermal energy modulation means for modulating said thermal energy injected into said workpiece according to the cutting speed variations by said cutting speed modulation means by adjusting said mean value or said rms value of the current;
      (ii) kinetic energy modulation means for modulating said kinetic energy of the plasma jet according to the cutting speed variations by said cutting speed modulation means or according to the adjustment of said mean value or said rms value of the current by said thermal energy modulation means; and
      (iii) voltage modulation means for modulating said plasma arc voltage according to the cutting speed variations by said cutting speed modulation means, to said mean value or said rms value of the cutting current by said thermal energy modulation means or to the flow rate or the pressure of said plasma gas by said gas control means.

13. A method of plasma cutting, comprising:
   a) defining a cut path in the workpiece to be cut;
   b) employing a plasma cutting torch, said torch comprising at least one plasma gas and a current, said current having a mean value and an rms value, wherein said plasma gas has a flowrate and a pressure;
   c) delivering a plasma jet with said torch in order to produce a cut kerf in said workpiece by movement of the torch relative to said workpiece along said cut path, said plasma jet comprising characteristics, said characteristics comprising thermal energy, kinetic energy, and plasma arc voltage;
   said torch movement comprising an initially programmed cutting speed and an instantaneous cutting speed, wherein any variation in said instantaneous cutting speed results in an instantaneous cutting speed variation; said cut path comprising at least the following successive portions, taken in the following order:
      (i) a first cut path portion in which the instantaneous cutting speed is greater than or equal to a first fixed non-zero threshold value,
      (ii) a deceleration portion in which the instantaneous cutting speed decreases down to a minimum value below said first threshold value,
      (iii) an acceleration portion in which the instantaneous cutting speed increases from said minimum value up to at least a second fixed non-zero threshold value, and
      (iv) a second path portion in which the instantaneous cutting speed is greater than or equal to said second fixed threshold value; and
   d) keeping said torch at an approximately constant distance from said workpiece along substantially the entire cut path and during the cutting of the workpiece by adapting the characteristics of said plasma jet in deceleration portion and in said acceleration portion, said adaptation comprising:
      (i) modulating the thermal energy injected into said workpiece according to the instantaneous cutting speed variations and by adjusting said mean value or said rms value of said current;
      (ii) modulating the kinetic energy of said plasma jet according to the culling speed variations or according to the adjustment of said mean value or said rms value of said current; and
      (iii) modulating said plasma arc voltage according to at least one parameter selected from the group consisting of the instantaneous cutting speed variation, the mean value of the current, the rms value of the current, the plasma gas flowrate, and the plasma gas pressure.

14. The method as claimed in claim 13, wherein said minimum value is less than about 0.1 times said first threshold value.

15. The method as claimed in claim 14, wherein said minimum value is zero or almost zero.

16. The method as claimed in claim 13, wherein said first threshold value is TV1 and said second threshold value is TV2, comprises: 0.8×TV1<TV2<1.2×TV1.

17. The method as claimed in claim 13, wherein said first threshold value and said second threshold value are approximately equal.

18. The method as claimed in claim 13, wherein said deceleration portion has a first length, and wherein said acceleration portion has a second length, wherein said first length and said second length are between about 1 mm and about 10 cm.

19. The method as claimed in claim 13, wherein said first length and said second length are between about 3 mm and about 30 mm.

20. The method as claimed in claim 13, wherein said deceleration portion and said acceleration portion make between them an angle between about 1° and about 160°.

21. The method as claimed in claim 20, wherein said deceleration portion and said acceleration portion make between them an angle between about 5° and about 120°.

22. The method as claimed in claim 13, wherein a speed difference comprises the difference between the initially programmed cutting speed and the instantaneous cutting speed within a time interval, wherein said thermal energy injected into the workpiece is reduced by reducing said mean value or said rms value of the current when said instantaneous cutting speed becomes less than said first threshold value or when the speed difference along the path exceeds a predetermined value.

23. A method of plasma cutting, comprising:
 a) employing a plasma cutting torch for a total cutting time, said torch comprising at least one plasma gas and a current, said current having a mean value and an rms value, wherein said plasma gas has a flowrate and a pressure;
 b) delivering a plasma jet with said torch in order to produce a cut kerf in the workpiece to be cut, by movement of said torch relative to said workpiece along a predefined cut path at a preset cutting speed, both the movement of said torch and said cutting speed being controlled by control means, said plasma jet comprising characteristics, said characteristics comprising thermal energy, kinetic energy, and plasma arc voltage, wherein the cutting speed can vary, thereby resulting in a cutting speed variation; and
 c) said preset cutting speed being stored in memory by said control means, in which one or more small or complex-shape features are cut into said workpiece, during at least part of the total cutting time, at a modulated cutting speed less than a programmed preset cutting speed, and at the same time the characteristics of the plasma jet are adapted over the period of cutting said feature or features so as to keep the torch at an approximately constant distance from the workpiece to be cut by:
 (i) modulating said thermal energy injected into the workpiece according to the cutting speed variations and by adjusting the mean value or the rms value of the current;
 (ii) modulating said kinetic energy of the plasma jet according to the cutting speed variations and/or according to the adjustment of the mean value or the rms value of the current; and
 (iii) modulating said plasma arc voltage according at least one parameter selected from the group consisting of the cutting speed variation, the mean value of the current, the rms value of the current, the plasma gas flowrate, and the plasma gas pressure.

24. The method as claimed in claim 23, wherein said control means is a numerical control console.

25. The method as claimed in claim 23, wherein:
 a) said small or complex-shape feature or features to be cut constitute cavities cut into said workpiece;
 b) the modulated cutting speed, whether constant or not, is kept below the programmed preset cutting speed during complete execution of each cavity; and
 c) the total cutting time, plasma gas pressure and plasma arc voltage are adapted to the actual cutting speed.

26. The method as claimed in claim 23, wherein said small or complex-shape feature or features to be cut constitute cavities cut into said workpiece.

27. The method as claimed in claim 23, wherein said small or complex-shape feature or features to be cut constitute circular holes, oblong holes, or holes of any other complex shape.

28. The method as claimed in claim 27, wherein said holes are symmetrical.

29. The method as claimed in claim 27, wherein said holes are asymmetrical.

30. The method as claimed in claim 27, wherein said holes have dimensions between a few mm to a few cm.

31. The method as claimed in claim 13, wherein said minimum value is less than about 0.1 times said second threshold value.

* * * * *

UNITED STATES PATENT AND TRADEMARK OFFICE
CERTIFICATE OF CORRECTION

| | | |
|---|---|---|
| PATENT NO. | : 7,015,416 B2 | Page 1 of 1 |
| APPLICATION NO. | : 10/492229 | |
| DATED | : March 21, 2006 | |
| INVENTOR(S) | : Michel Delzenne | |

It is certified that error appears in the above-identified patent and that said Letters Patent is hereby corrected as shown below:

In Column 12, line 53, replace the word "culling" with the word --cutting--.

In Column 14, line 16, replace the words "according at" with --according to at--.

Signed and Sealed this

Fourth Day of July, 2006

JON W. DUDAS
*Director of the United States Patent and Trademark Office*